W. P. COLLINS.
TIRE IRON.
APPLICATION FILED OCT. 28, 1915.
1,272,622. Patented July 16, 1918.
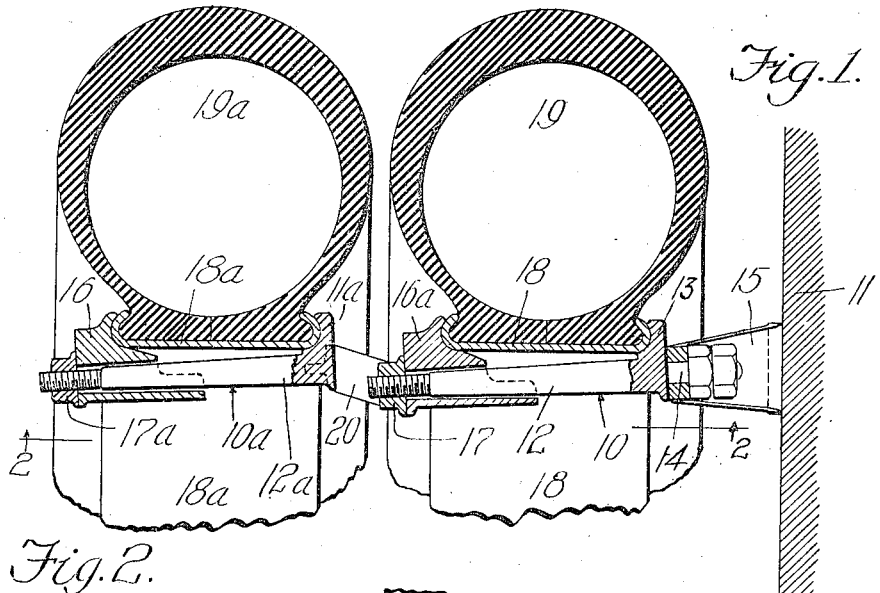
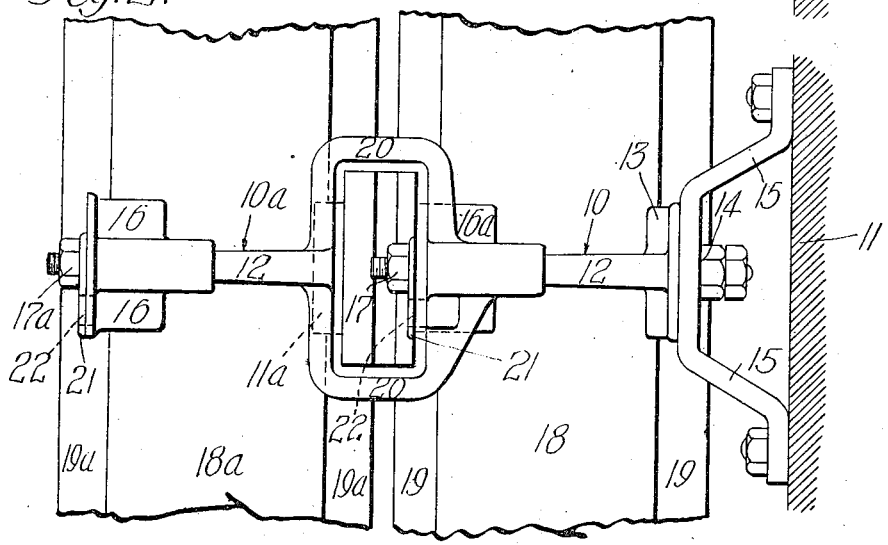
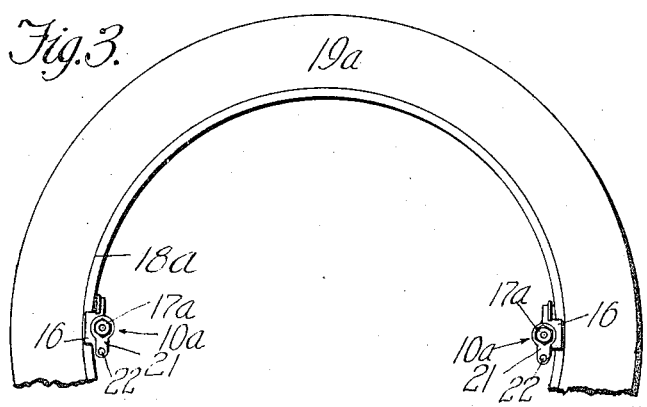
Inventor
William P. Collins
by James T. Andrews
his Attorney.

UNITED STATES PATENT OFFICE.

WILLIAM P. COLLINS, OF LOS ANGELES, CALIFORNIA.

TIRE-IRON.

1,272,622.   Specification of Letters Patent.   Patented July 16, 1918.

Application filed October 28, 1915. Serial No. 58,490.

*To all whom it may concern:*

Be it known that I, WILLIAM P. COLLINS, a citizen of the United States, residing at Los Angeles, in the county of Los Angeles, State of California, have invented new and useful Improvements in Tire-Irons, of which the following is a specification.

This invention relates to irons for carrying automobile tires and the like; and the primary object of the invention is to provide a simple and effective device which is adapted to carry one or any number of tires, conveniently and accessibly.

In a preferred form of device embodying my invention I have a plurality of tire supporting or carrying devices, each a duplicate, or substantially a duplicate, of the others; and the devices are so made that they may be easily assembled to provide for carrying any desired number of tires, or may be dismounted so that, when only one tire is carried, there are no superfluous tire carrying devices used. The details of this preferred form, and the nature and scope of my invention, are made fully apparent in the following specification, reference being had to the accompanying drawings, in which for the purpose of this specification, I have illustrated a preferred form of my device.

In these drawings Figure 1 is a longitudinal section of the complete tire iron, as for carrying two tires, showing the tires in place; Fig. 2 is an elevation taken as indicated by line 2—2 on Fig. 1, and Fig. 3 is a rear elevation reduced in scale, showing a tire or tires carried by my tire irons.

In the drawings I have shown a typical tire iron 10 mounted upon, say, the rear of an automobile 11. In this instance (although I do not limit my invention to this particular form of tire iron) the iron includes a shank or stud 12 which has at its rear end a stationary tire clamping member 13, and is mounted and supported at 14 upon any suitable supporting base or bracket 15 which is secured to the body of the automobile. In the ordinary use of this single tire iron there is a movable adjustable clamping member 16 (which I show in another position in the drawings) which is mounted upon the stud 12 in the same position as that in which I show the movable clamping member $16^a$; and the nut 17 holds the movable clamping member in position; so that the rim 18 of the tire 19 is clamped between the stationary and movable clamping members in the manner shown in the drawings.

Now, for the purposes of my invention, I provide another tire supporting device $10^a$ which is in all substantial parts a duplicate of the tire supporting device 10 and which includes a stud $12^a$ having at its rear end a stationary clamping member $11^a$; and the movable adjustable clamping member 16 is placed upon the stud $12^a$ and held in position by the nut $17^a$; so that the rim $18^a$ of a tire $19^a$ is held in the usual manner.

Although the movable clamping member $16^a$ is an operative part of the tire supporting device 10, this movable clamping member $16^a$ is physically a part of the tire supporting device $10^a$; being preferably made integrally with the stationary clamping member $11^a$ and the stud $12^a$. I integrally connect the clamping members $11^a$ and $16^a$ by an integral connecting member 20 preferably in the form shown in Figs. 1 and 2, in the form of a yoke, leaving an interior space for the manipulation of the nut 17. The nuts 17 and $17^a$ may have extensions 21 with perforations 22 for the hasp of a padlock to lock the nut in place and to prevent unauthorized removal of the tires.

As hereinbefore explained, when only one tire is being carried the clamping member 16 is put on the stud 12 in place of the clamping member $16^a$; and the tire holding device $10^a$ is not necessarily used at all. When more than one tire is carried, the clamping member $16^a$ takes the place of the clamping member 16, which clamping member 16 is then placed on the said stud $12^a$ as shown. It will be obvious that, by the provision of as many tire holding devices $10^a$ as desired, my system may be extended to carry any number of tires. It will also be noted that, regardless of the number of tires carried, any tire may be taken off the irons without having to take any other tire off the irons. Thus, if it is desired to take the tire 19 off the irons, the nuts 17 are loosened and clamping members $16^a$ removed and the tire removed without disturbing tire $19^a$.

I do not limit my invention to the particular and specific form of apparatus shown. I have illustrated my improved iron as applied to one particular type or design of tire irons now in use; but it will be readily understood that my invention is applicable to tire irons of various designs.

Having described a preferred form of my invention, I claim:

1. A tire iron for carrying spare tires, embodying a plurality of tire holding devices each comprising a stationary and a movable clamping member, the stationary clamping member of one device being rigidly and permanently connected with and mounted on the movable clamping member of another adjacent device, and stationary mounting means for the stationary member of the second mentioned device.

2. A tire iron for carrying spare tires, embodying a plurality of tire holding devices, each device comprising a stationary and a movable clamping member, the movable clamping member of one device being formed integrally with the stationary clamping member of the adjacent device, and stationary mounting means for the stationary member of the second mentioned device.

3. A tire iron for carrying spare tires, embodying a plurality of tire holding devices each comprising a clamp stud, a stationary clamping member and a movable clamping member adjustable on the stud, the stationary clamping member and stud of one device being rigidly and permanently mounted on and connected with the movable clamping member of another adjacent device, and stationary mounting means for the stationary member of the second mentioned device.

4. A tire iron for carrying tires, embodying a plurality of tire holding devices each comprising a stationary clamping member and a stud with a screw-threaded end, a movable clamping member adjustable on said stud, and a nut engaging the screw threaded end and bearing against the movable member to hold it in place, means for stationarily supporting the stationary clamping member and stud of one of said devices, and means for supporting the stationary clamping member and stud of another of said devices, embodying an integral supporting connection between the movable clamping member of the first mentioned device and the stationary clamping member and stud of the second mentioned device.

5. A tire iron or the like, embodying a plurality of holding devices each comprising a stationary clamping member and a tapered stud with a screw threaded end, a movable clamping member adjustable on said stud, and a nut engaging the screw threaded end and bearing against the movable member to hold it in place, means for permanently supporting the stationary clamping member and stud of one of said devices, the stationary clamping member and stud of each device being formed integrally, and the stationary member and stud of another adjacent one of said devices being integrally connected to and supported on the movable clamping member of the said first mentioned device, said connection embodying a connecting member in hollow rectangular formation, the hollow interior of said member providing for access to the nut engaging the screw threaded stud end of the first mentioned device.

6. A tire iron for carrying spare tires, embodying a plurality of tire holding devices each comprising relatively stationary and movable clamping members, the stationary clamping member of one of said devices being mounted on and supported by the movable clamping member of another adjacent device, and stationary mounting means for the stationary member of the second mentioned device.

7. In a tire iron for carrying spare tires, a stationary clamping member having a projecting stud, stationary mounting means for said clamping member, a movable clamping member adapted to fit over said stud, another clamping member similar to the first mentioned stationary clamping member, said last mentioned clamping member being secured to and supported upon the said movable clamping member, the said last mentioned clamping member having a stud in duplicate of the stud of the first mentioned clamping member; and a movable clamping member adapted to fit upon either of the said studs to thereby coöperate with either the first mentioned clamping member or the last mentioned clamping member.

8. A tire iron for carrying spare tires, embodying a plurality of tire holding devices each comprising a relatively stationary and a relatively movable clamping member, means for stationarily mounting and supporting the stationary member of one device, the stationary member of another device being mounted on and supported by the movable member of the first mentioned device, and the movable member of the second mentioned device being a substantial duplicate of the movable member of the first mentioned device and adapted to coöperate with the stationary member of either of said devices.

In witness that I claim the foregoing I have hereunto subscribed my name this 21st day of October, 1915.

WM. P. COLLINS.

Witness:
ELWOOD H. BARKELEW.